United States Patent [19]

Gjertsen et al.

[11] Patent Number: 4,993,864
[45] Date of Patent: Feb. 19, 1991

[54] RECONSTITUTABLE CONTROL ASSEMBLY HAVING REMOVABLE CONTROL RODS WITH DETACHABLE SPLIT UPPER END PLUGS

[75] Inventors: Robert K. Gjertsen, Columbia; Ronald P. Knott, Irmo; James A. Sparrow, Columbia, all of S.C.

[73] Assignee: Westinghouse Electric Corp., Pittsburgh, Pa.

[21] Appl. No.: 426,939

[22] Filed: Oct. 26, 1989

Related U.S. Application Data

[60] Division of Ser. No. 284,566, Dec. 15, 1988, Pat. No. 4,888,151, which is a continuation-in-part of Ser. No. 232,970, Aug. 17, 1988, abandoned.

[51] Int. Cl.⁵ .................... B25G 3/00; G21C 7/10
[52] U.S. Cl. .................... 403/343; 403/284; 403/296; 403/299; 376/327
[58] Field of Search ........... 376/327, 440, 446, 233, 376/463; 403/284, 296, 299, 307, 315, 361, 343

[56] References Cited

U.S. PATENT DOCUMENTS

| 1,851,714 | 3/1932 | McCullough | 403/296 |
|---|---|---|---|
| 1,907,960 | 5/1933 | Guillet | 403/296 |
| 1,926,925 | 9/1933 | Wescott | 403/296 |
| 2,059,175 | 10/1936 | Myracle | 403/299 |
| 2,247,928 | 7/1941 | Temple, Jr. | 403/307 |
| 2,251,031 | 7/1941 | Bozeman, Jr. | 403/299 |
| 3,062,568 | 11/1962 | Andresen et al. | 403/307 |
| 3,335,064 | 8/1967 | Whittaker et al. | 176/86 |
| 3,359,449 | 12/1967 | Trask | 376/327 |
| 3,510,398 | 5/1970 | Wood | 176/86 |
| 4,189,346 | 2/1980 | Donck et al. | 376/446 |
| 4,314,885 | 2/1982 | Edwards et al. | 376/327 |
| 4,323,428 | 4/1982 | Schallenberger | 376/353 |
| 4,326,919 | 8/1982 | Hill | 376/267 |
| 4,344,915 | 8/1982 | Christiansen | 376/437 |
| 4,381,283 | 4/1983 | Walton | 376/327 |
| 4,406,561 | 9/1983 | Ewing | 403/284 |
| 4,452,755 | 6/1984 | Hylton | 376/440 |
| 4,500,224 | 2/1985 | Ewing | 403/284 |
| 4,599,213 | 7/1986 | Leclercq et al. | 376/446 |
| 4,646,415 | 3/1987 | Wilson et al. | 29/426.5 |
| 4,664,874 | 5/1987 | Shallenberger et al. | 376/446 |
| 4,684,498 | 4/1987 | Paul | 376/446 |
| 4,707,329 | 11/1987 | Freeman | 376/449 |
| 4,711,756 | 11/1987 | Nakazato | 376/327 |
| 4,770,846 | 9/1988 | Land et al. | 376/446 |
| 4,772,448 | 9/1988 | Popalis et al. | 376/446 |
| 4,790,208 | 12/1988 | Johnson | 403/307 |
| 4,820,475 | 4/1989 | Mayers et al | 376/327 |
| 4,820,479 | 4/1989 | Hornak et al. | 376/446 |
| 4,855,100 | 8/1989 | Shallenberger et al. | 376/327 |

FOREIGN PATENT DOCUMENTS

| 0158812 | 10/1985 | European Pat. Off. . | |
| 0159509 | 10/1985 | European Pat. Off. . | |
| 0225805 | 6/1987 | European Pat. Off. . | |
| 8608381 | 12/1987 | France . | |
| 59-67492 | 4/1984 | Japan | 376/327 |
| 62-64985 | 3/1987 | Japan . | |

Primary Examiner—Harvey E. Behrend

[57] ABSTRACT

A reconstitutable control assembly has a spider structure which supports control rods by detachable attachment joints. Each attachment joint includes a hollow connecting finger on the spider structure and an elongated detachable split upper end plug on each control rod. The split upper end plug includes a pair of separate upper and lower plug portions. The upper plug portion has upper, middle and lower sections, whereas the lower plug portion has upper, middle and lower segments. The upper section of the upper plug portion is rigidly attached to the connecting finger on the spider structure, whereas the lower segment of the lower plug portion is rigidly connected to the control rod. Also, the lower section of the upper plug portion and the middle segment of the lower plug portion have complementary threads defined thereon for rigidly threadably attaching the upper and lower plug portions to one another. Two embodiments of locking features can be used in conjunction with the upper and lower plug portions for locking them together so as to resist their unthreading from one another.

5 Claims, 7 Drawing Sheets

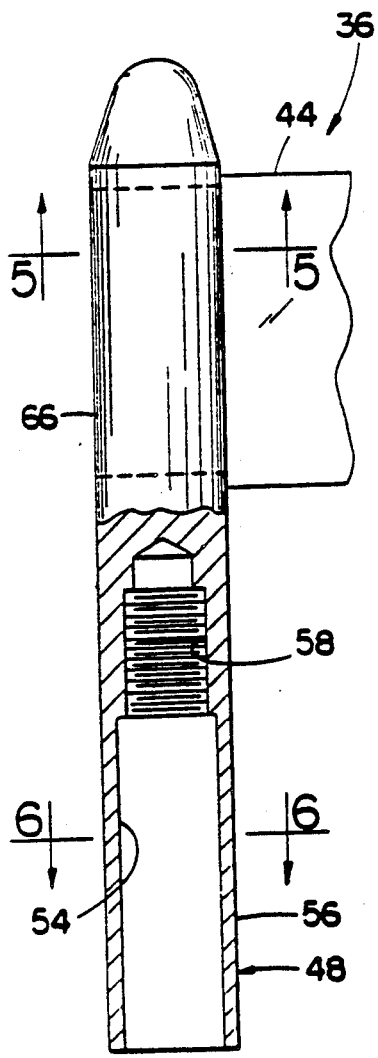
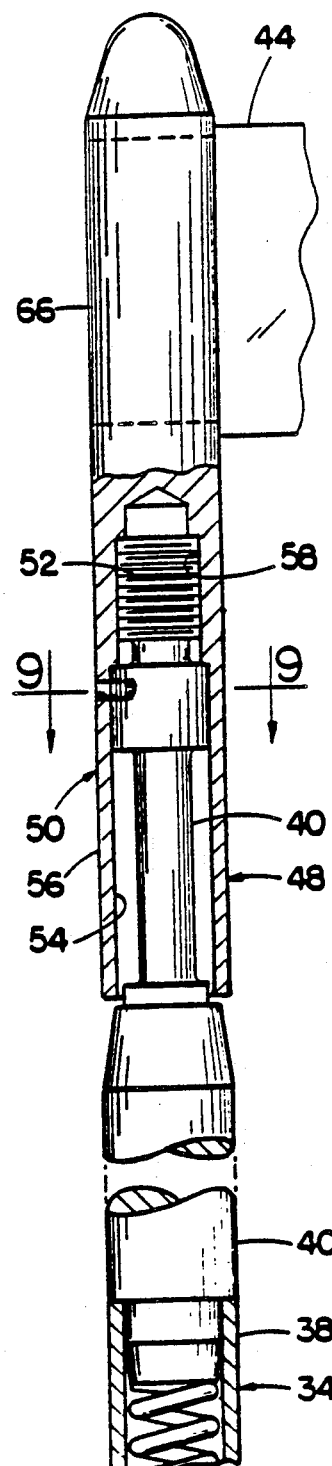
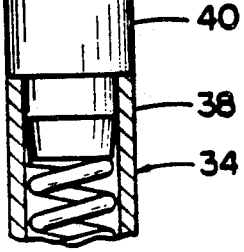
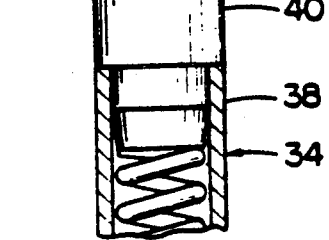
FIG. 9 (PRIOR ART)
FIG. 4 (PRIOR ART)
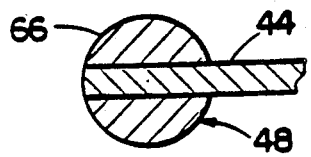
FIG. 5 (PRIOR ART)
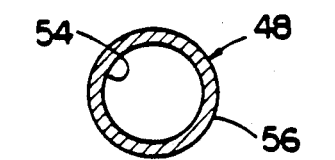
FIG. 6 (PRIOR ART)
FIG. 7 (PRIOR ART)
FIG. 8 (PRIOR ART)

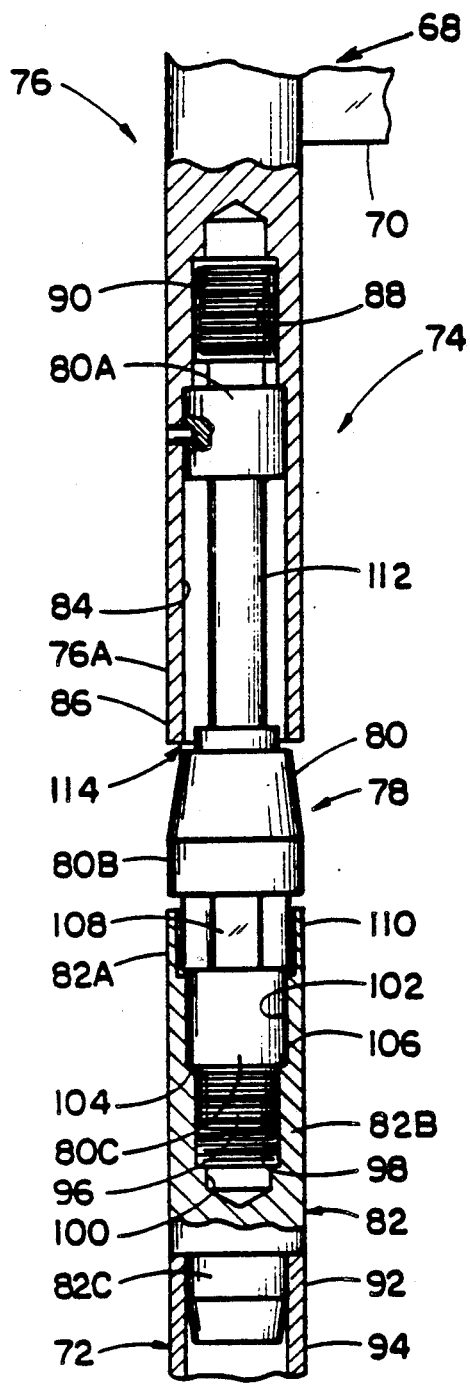
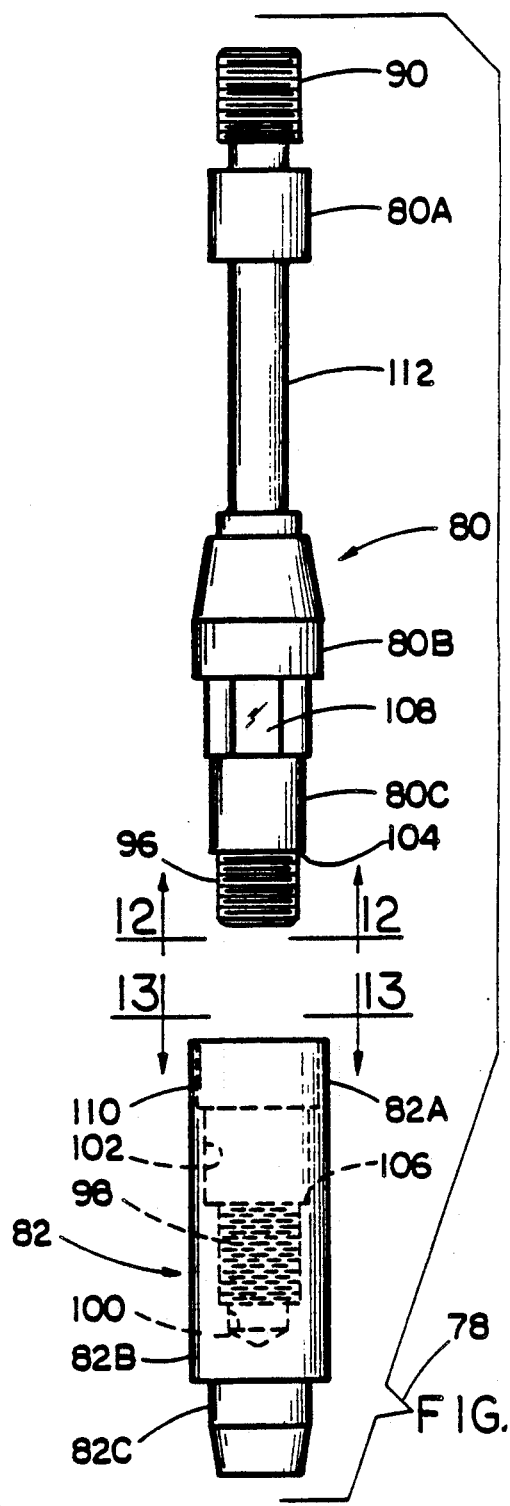
FIG. 10
FIG. 11
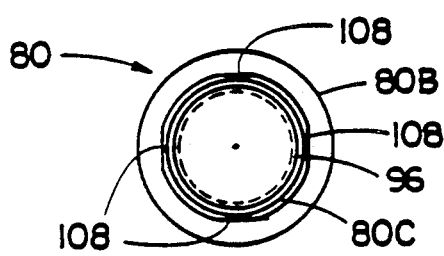
FIG. 12
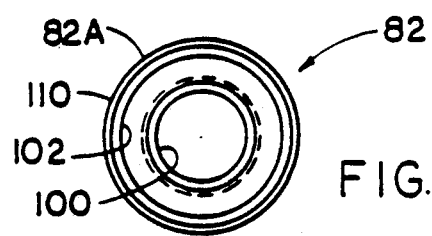
FIG. 13

RECONSTITUTABLE CONTROL ASSEMBLY HAVING REMOVABLE CONTROL RODS WITH DETACHABLE SPLIT UPPER END PLUGS

This is a Divisional application under 37 CFR 1.60 of pending prior application Ser. No. 07/284,566, filed Dec. 15, 1988, (now U.S. Pat. No. 4,888,151) which is a Continuation-in-Part of application Ser. No. 07/232,970, that was filed Aug. 17, 1988 and is now abandoned.

CROSS REFERENCE TO RELATED APPLICATIONS

Reference is hereby made to the following copending applications dealing with related subject matter and assigned to the assignee of the present invention:

1. "Burnable Absorber Rod Push Out Attachment Joint" by Joseph B. Mayers et al, assigned U.S. Ser. No. 089,384 and filed Aug. 25, 1987, a division of U.S. Ser. No. 774,850, filed Sept. 12, 1985, now abandoned. (W.E. 52,875-B-1)

2. "Burnable Absorber Rod Push Out Attachment Joint" by Joseph B. Mayers et al, assigned U.S. Ser. No. 089,203 and filed Aug. 25, 1987, a division of U.S. Ser. No. 774,850, filed Sept. 12, 1985, now abandoned. (W.E. 52,875-B-2)

3. "Reconstitutable Control Rod Spider Assembly" by John M. Shallenberger et al, assigned U.S. Ser. No. 162,841 and filed Mar. 2, 1988. (W.E. 54,319)

BACKGROUND OF THE INVENTION

1. Field of the Invention

The present invention relates generally to nuclear reactors and, more particularly, is concerned with a reconstitutable control rod spider assembly having removable control rods with detachable split upper end plugs.

2. Description of the Prior Art

In a typical nuclear reactor, such as a pressurized water type, the reactor core includes a multiplicity of fuel assemblies. Each fuel assembly is composed of top and bottom nozzles with a plurality of elongated transversely spaced guide thimbles extending longitudinally between and attached at opposite ends to the nozzles. Also, a plurality of transverse support grids are axially spaced along and attached to the guide thimbles. Further, a plurality of elongated fuel elements or rods transversely spaced apart from one another and from the guide thimbles are supported by the transverse grids between the top and bottom nozzles. The fuel rods each contain fissile material and are grouped together in an array which is organized so as to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

Since the rate of heat generation in the reactor core is proportional to the nuclear fission rate, and this, in turn, is determined by the neutron flux in the core, control of heat generation at reactor start-up, during its operation and at shutdown is achieved by varying the neutron flux. Generally, this is done by absorbing excess neutrons using control rods which contain neutron absorbing material. The guide thimbles, in addition to being structural elements of the fuel assembly, also provide channels for insertion of the neutron absorber control rods within the reactor core. The level of neutron flux and thus the heat output of the core is normally regulated by the movement of the control rods into and from the guide thimbles.

One common arrangement utilizing control rods in association with a fuel assembly can be seen in U.S. Pat. No. 4,326,919 to Hill. This patent shows a control rod spider assembly which includes a plurality of control rods and a spider structure supporting the control rods at their upper ends. The spider structure, in turn, is connected to a control drive mechanism that vertically raises and lowers (referred to as a stepping action) the control rods into and out of the hollow guide thimbles of the fuel assembly. The typical construction of the control rod used in such an arrangement is in the form of an elongated metallic cladding tube having a neutron absorbing material disposed within the tube and with end plugs at opposite ends thereof for sealing the absorber material within the tube.

The spider structure typically includes a plurality of radially extending vanes supported on and circumferentially spaced about a central hub. The vanes are flat metal plates positioned on edge and being connected at their inner ends to the central hub. Cylindrical shaped control rod connecting fingers are mounted to and supported by the vanes, with some of the vanes having only a single connecting finger and other vanes having a spaced pair of connecting fingers associated therewith.

Typically, the upper end plug of each control rod has a threaded outer end which is receivable into a bore in the lower portion of one finger of the spider structure and threadable into a tapped hole formed in the finger at the inner end of the bore. The end plug is then secured or locked therein by a key or pin inserted into the side of the finger and the end plug and then welded therein. Generally speaking, the above-described control rod spider assembly is not reconstitutable, that is, the assembly cannot readily be taken apart and worn or damaged components replaced. Instead, the whole assembly must be discarded.

In many older nuclear reactor plants, the control rods are approaching the end of their design life. Furthermore, in a number of newer plants with modified reactor internals, the control rods are experiencing accelerated wear. In most cases wear occurs over local areas on the cladding of some, but not all, control rods of a given control rod spider assembly. Wear is believed to be caused by coolant flow-induced vibration. The severity of the clad wear is dependent upon the type of nuclear plant and internals design and typically occurs only on a limited number of control rods of a given assembly.

Consequently, there is a growing interest in and need for reconstitutable control rod spider assemblies wherein selected individual control rods that are prematurely worn or damaged can be removed and replaced. A spider assembly which allows removal of a control rod from a spider structure by severing or cutting off the threadably fastened top end of the control rod and the fastener is disclosed in French patent application No. 86/08381. A spider assembly which seems to allow removal of a control rod from a spider by removing a set screw and unthreading the upper end plug of the control rod from a support rod axially movably mounted to a spider vane finger is disclosed in U.S. Patent to Nakazato (4,711,756). Spider assemblies which allow removal of a control rod from a spider structure by deforming a locking element on the top end of the control rod are disclosed in U.S. Patents to Edwards et al (4,314,885) and Walton (4,381,283). However, none of these disclosures would appear to be the optimum approach to providing a reconstitutable control rod spider assembly.

SUMMARY OF THE INVENTION

The present invention provides a reconstitutable control rod spider assembly designed to satisfy the aforementioned needs. The reconstitutable control assembly of the present invention incorporates a removable control rod with a split upper end plug for detachably attaching the control rod to a vane finger of the spider. Specifically, the split upper end plug is composed of two separate upper and lower portions.

The upper and lower portions of each upper end plug are attached together by screw threading and are torqued to incorporate joint preload. Also, a locking feature is defined by the portions in order to prevent their loosening during reactor operation. Locking is accomplished by swaging/crimping a thin-walled upper segment of the lower portion onto a flats-bearing middle section of the lower portion of the upper end plug. The flats are thus provided on the upper portion to prevent subsequent joint loosening. Removal of a control rod is accomplished by unscrewing the rod which will rotate the lower portion of the upper end plug relative to the upper portion thereof and overcome the crimp retainer locking feature.

A replacement control rod can then be reinstalled and crimped for rod retention. The thin-walled upper section to be crimped is virgin material on the lower portion of the upper end plug on the replacement control rod. The detachable attachment features incorporated by the separate upper and lower portions of the upper end plug do not adversely impact an existing desired feature such as the flexure joint which is retained by the control rod upper end plug.

As an alternative to the above-described locking feature, a radially flexible and expandable thread-defining coil can be employed between the threaded lower section and middle segment of the respective upper and lower end plug portions to provide frictional resistance to rotation once attachment of the portions has been completed. The coil makes it possible to rotate the control rod against the frictional resistance posed by the coil without the need for overriding or overcoming a crimp retainer-type locking feature. Where the crimp locking feature was previously employed, the middle section and upper segment of the respective upper and lower end plug portions are of cylindrical configuration and form a slip fit type joint instead.

Accordingly, the present invention is directed to an end plug for use in facilitating replacement of a neutron absorber control rod on a control assembly spider structure. The end plug comprises a pair of separate upper and lower plug portions with the upper plug portion having integral upper, middle and lower sections and the lower plug portion having integral upper, middle and lower segments. The upper section of the upper plug portion is configured for rigid attachment to the control assembly spider structure for supporting the control rod. The lower segment of the lower plug portion is configured for rigid connection to the control rod. Also, the lower section of the upper plug portion and the middle segment of the lower plug portion are complementarily configured for rigid threaded attachment to one another. Further, the middle section of the upper plug portion and the upper segment of the lower plug portion are complementarily configured for interlocking attachment to one another so as to resist unthreaded detachment of the upper and lower plug portions from one another.

Also, the present invention sets forth in a reconstitutable control assembly including a spider structure and at least one control rod, an attachment joint for detachably fastening the control rod to the spider structure. The attachment joint comprises: (a) a hollow connecting finger on the spider structure; and (b) an elongated detachable split upper end plug on the control rod having a pair of separate upper and lower plug portions. The upper plug portion has integrally-connected tandemly-arranged upper, middle and lower sections. The lower plug portion has integrally-connected tandemly-arranged upper, middle and lower segments.

More particularly, the upper section of the upper plug portion is rigidly attached to the connecting finger on the spider structure, whereas the lower segment of the lower plug portion is rigidly connected to the control rod. Also, the lower section of the upper plug portion and the middle segment of the lower plug portion have complementarily threaded means defined thereon for rigidly threadably attaching the upper and lower plug portions to one another. Further, the middle section of the upper plug portion and the upper segment of the lower plug portion have complementary interlocking means defined thereon for locking the upper and lower plug portions together so as to resist unthreading of the upper and lower plug portions from one another.

Further, the present invention is directed to a modified end plug for use in facilitating replacement of a neutron absorber control rod on a control assembly spider structure. The modified end plug comprises a pair of separate upper and lower plug portions with the upper plug portion having integral upper, middle and lower sections and the lower plug portion having integral upper, middle and lower segments. Also, the end plug includes means in the form of a radially flexible and expandable thread-defining coil.

Further, the upper section of the upper plug portion is configured for rigid attachment to a control assembly spider structure for supporting a control rod, whereas the lower segment of the lower plug portion is configured for rigid connection to the control rod. Still further, the lower section of the upper plug portion and the middle segment of the lower plug portion are threaded complementarily to receive therebetween the radially flexible and expandable thread-defining coil for threaded engagement therewith in a relationship in which the thread-defining coil frictionally resists rotation of the upper and lower plug portions relative to one another. Finally, the middle section of the upper plug portion and the upper segment of the lower plug portion are configured complementarily for defining a slip fit joint between the upper and lower plug portions.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 4 is an enlarged fragmentary view, with parts partially sectioned and broken away, of a spider structure of the control assembly of FIG. 3.

FIG. 5 is a cross-sectional fragmentary view of a vane and control rod connecting finger of the spider structure taken along line 5—5 of FIG. 4.

FIG. 6 is a cross-sectional view of the connecting finger taken along line 6—6 of FIG. 4.

FIG. 7 is an enlarged fragmentary view of one control rod of the control assembly of FIG. 3, illustrating the upper end plug thereof.

FIG. 8 is an enlarged fragmentary view, with parts partially sectioned and broken away, of the control assembly of FIG. 3, illustrating a prior art attachment joint between the control rod connecting finger on one vane of the spider structure of the control assembly and the upper end plug of one of the control rods thereof.

FIG. 9 is a cross-sectional view of the upper end plug inserted in the connecting finger taken along line 9—9 of FIG. 8, illustrating a pin locking the end plug and finger together.

FIG. 10 is a view similar to that of FIG. 8, but illustrating a detachable split upper end plug on a control rod being constructed in accordance with the principles of the present invention.

FIG. 11 is an exploded view, on a slightly smaller scale than in FIG. 10, of the detachable split upper end plug by itself.

FIG. 12 is an enlarged bottom plan view of an upper plug portion of the split upper end plug as seen along line 12—12 of FIG. 11.

FIG. 13 is an enlarged top plan view of a lower plug portion of the split upper end plug as seen along line 13—13 of FIG. 11.

DETAILED DESCRIPTION OF THE INVENTION

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Figure 1:
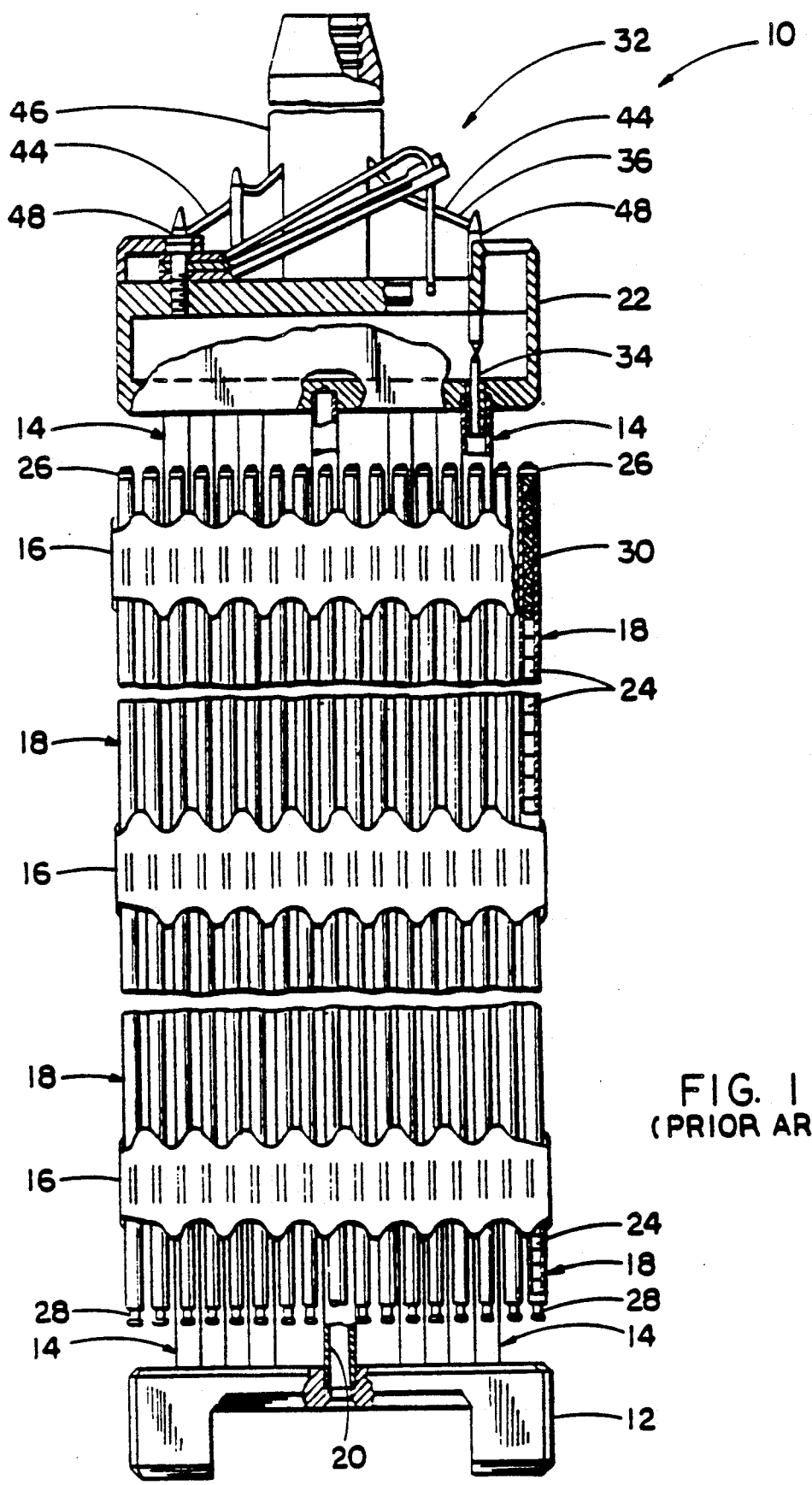
FIG. 1 is a side elevational view, with parts partially sectioned and broken away for purposes of clarity, of a prior art fuel assembly having a prior art control rod spider assembly disposed above the fuel assembly.

Referring now to the drawings, and particularly to FIG. 1, there is shown an elevational view of a nuclear reactor fuel assembly, represented in vertically foreshortened form and being generally designated by the numeral 10. Being the type used in PWR, the fuel assembly 10 basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14 to form an integral assembly capable of being conveniently handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactor power of the nuclear reactor. A liquid moderator/coolant such as water, or water containing boron, is pumped upwardly through the fuel assemblies of the core in order to extract heat generated therein for the production of useful work.

Prior Art Control Rod Spider Assemblies

Figure 2:
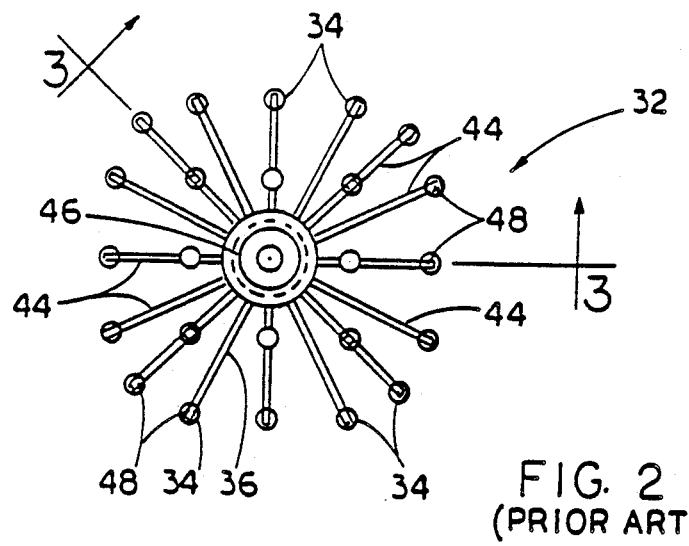
FIG. 2 is a top plan view of the control rod spider assembly removed from the fuel assembly of FIG. 1.
Figure 3:
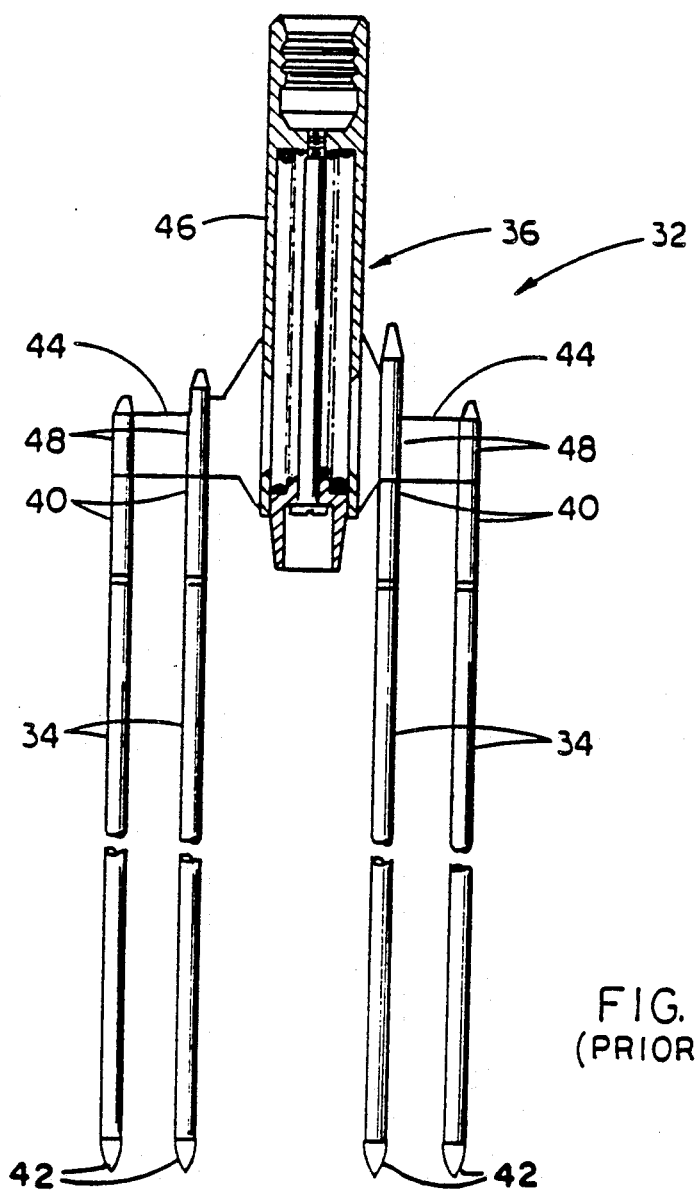
FIG. 3 is an elevational view, with parts partially sectioned, of the control assembly as seen along line 3—3 of FIG. 2.
Figure 14:
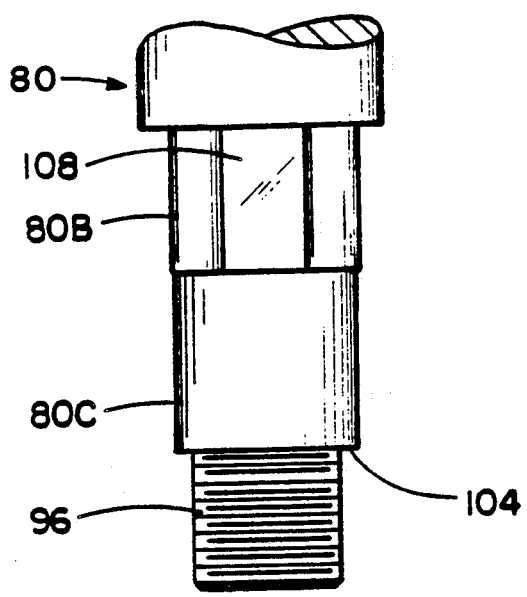
FIG. 14 is an enlarged fragmentary side elevational view of the upper plug portion of the split upper end plug of FIG. 11.
Figure 15:
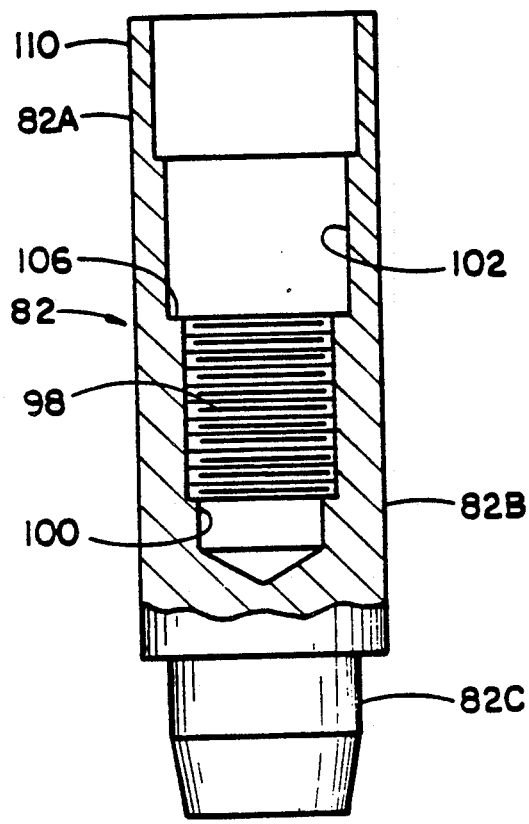
FIG. 15 is an enlarged fragmentary longitudinal axial sectional view of the lower plug portion of the split upper end plug of FIG. 11.
Figure 16:
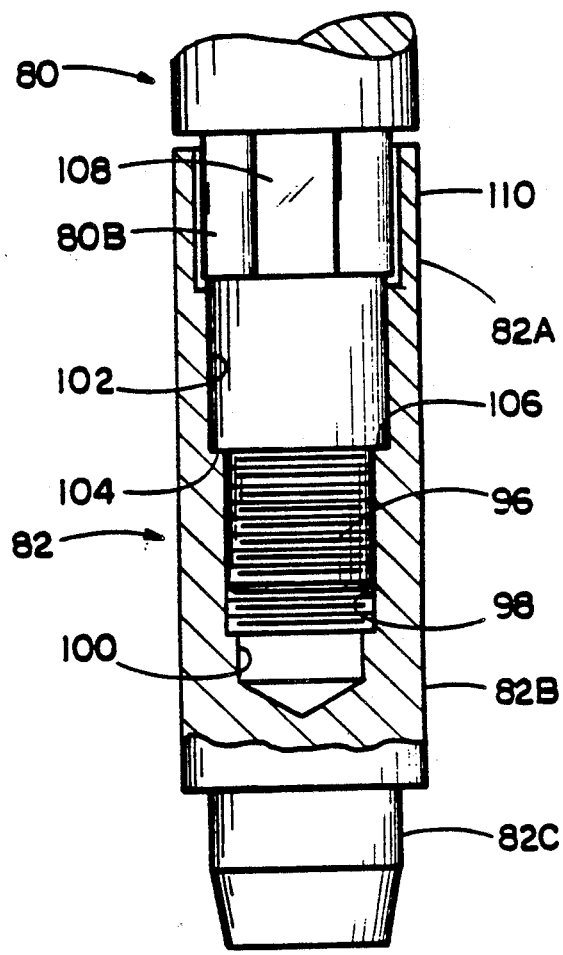
FIG. 16 is an enlarged fragmentary side elevational view, partly in longitudinal section, of the split upper end plug of FIG. 10 illustrating the upper and lower plug portions attached together.
Figures 17, 18:
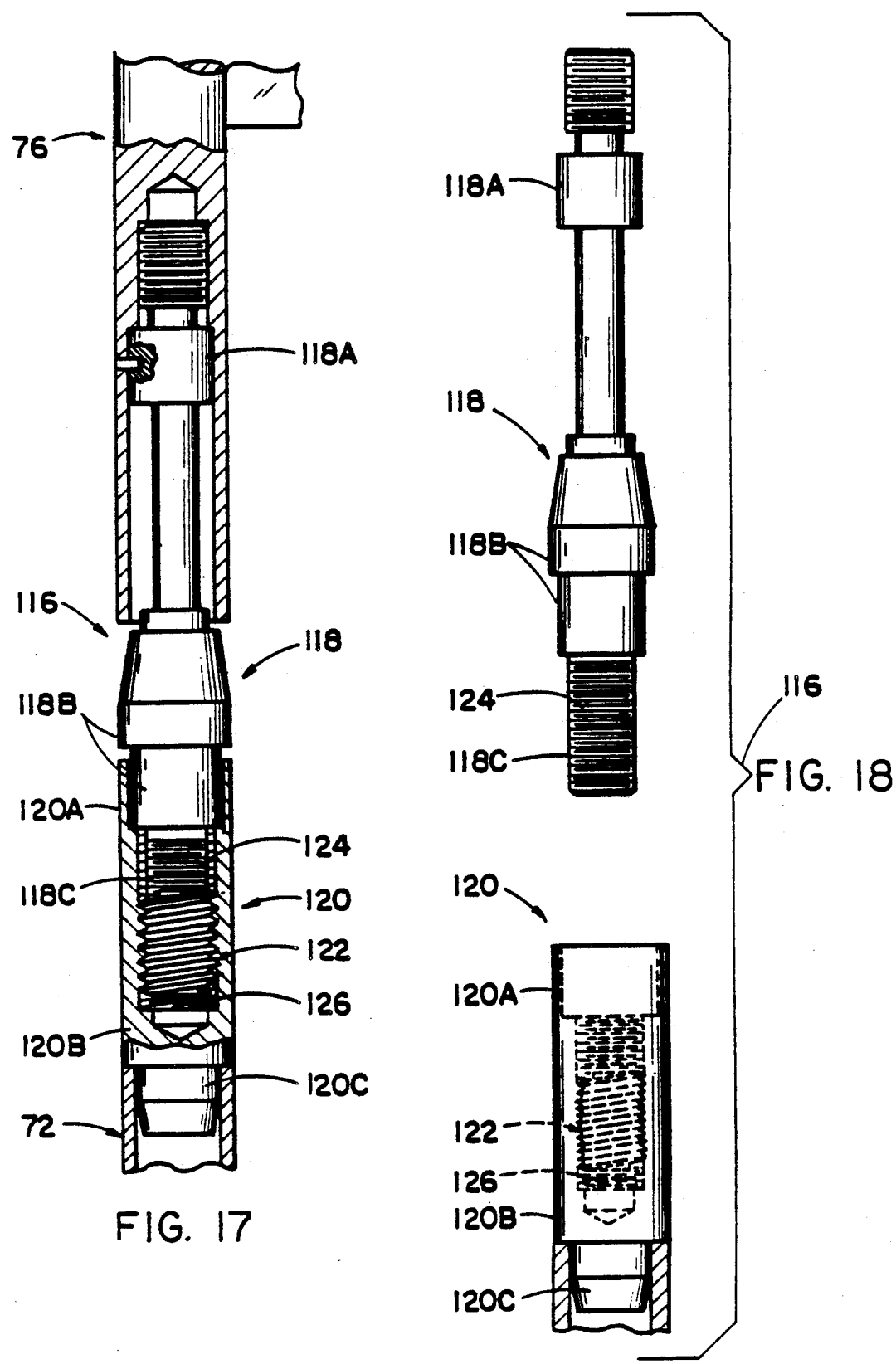
FIG. 17 is a view similar to that of FIG. 10, but illustrating a modified form of the detachable split upper end plug which employs a different type of locking feature.
FIG. 18 is a view similar to that of FIG. 11, but illustrating the modified split upper end plug.
Figure 19:
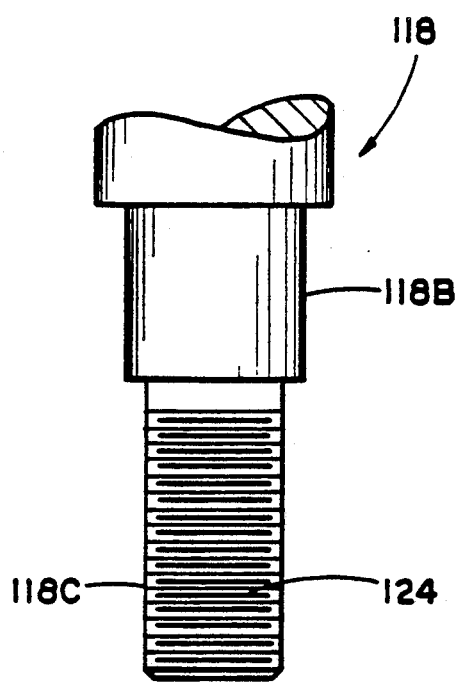
FIG. 19 is a view similar to that of FIG. 14, but illustrating the upper plug portion of the modified split upper end plug.
Figure 21:
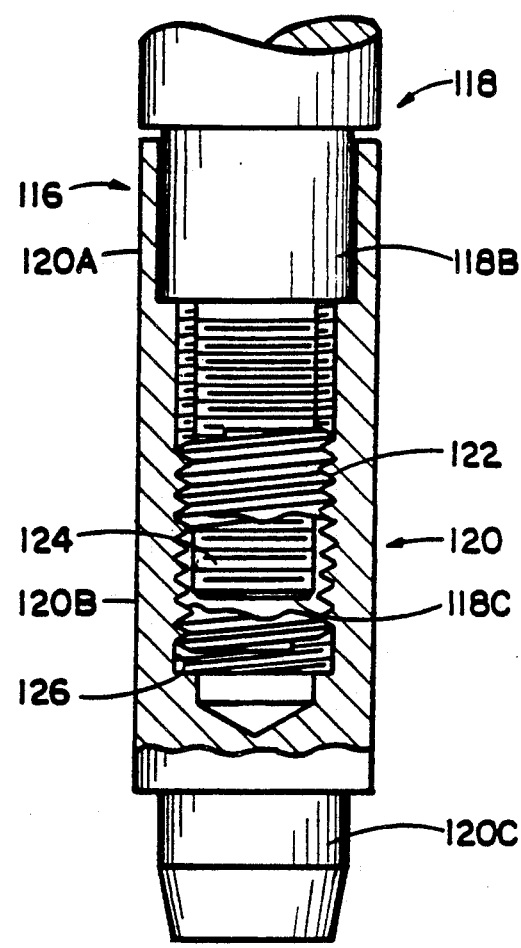
FIG. 21 is a view similar to that of FIG. 16, but illustrating the upper and lower plug portions of the modified split upper end plug attached together.
Figure 20:
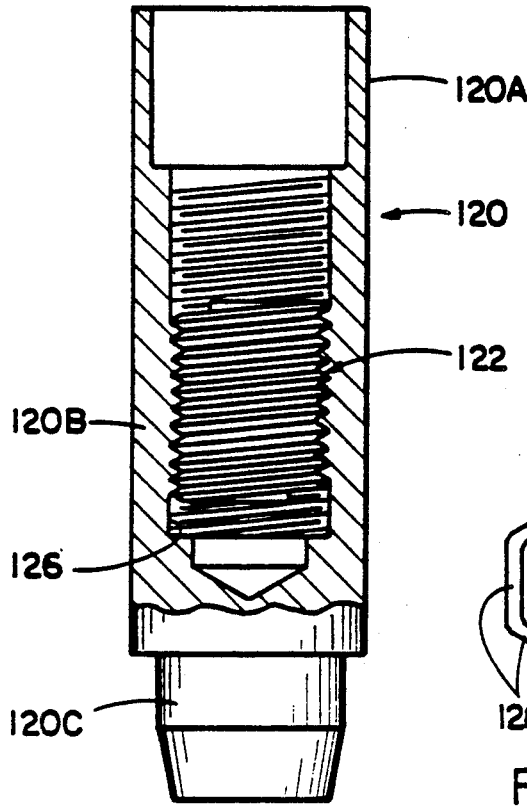
FIG. 20 is a view similar to that of FIG. 15, but illustrating the lower plug portion of the modified split upper end plug.

Turning now to FIGS. 2 and 3 as well as FIG. 1, there is shown a typical embodiment of a conventional control rod spider assembly, generally designated 32, designed for use in the conventional fuel assembly 10 of FIG. 1. In its basic components, the control assembly 32 includes a plurality of control rods 34 and a spider structure 36 which supports the control rods at their upper ends. The spider structure 36 holds the control rods 34 in a pattern matched to that of the guide thimbles 14 which adapts them to be inserted through the top nozzle 22 and downward through the guide thimbles 14 of the PWR fuel assembly 10. The spider structure 36 is connected to a control mechanism (not shown) which is operable in a known manner to move the control rods 34 so as to regulate core power.

In a typical construction, each control rod 34 of the control assembly 32 is composed of an elongated metallic cladding tube 38 having a neutron absorbing material disposed therein and upper and lower end plugs 40,42 attached at opposite ends of the cladding tube 38 for sealing the absorber material therewithin. The spider structure 36 of the control assembly 32 typically includes a plurality of radially extending flutes or vanes 44 supported on and circumferentially spaced about a central hub 46. Cylindrical shaped control rod connecting fingers 48 are mounted to and supported by the vanes 44. Some of the vanes 44 have only a single connecting finger 48 attached thereon, whereas other vanes 44 have a spaced pair of connecting fingers 48 associated therewith.

Turning now to FIGS. 4-9, there is illustrated one prior art attachment joint, generally indicated by the numeral 50, provided between each control rod connecting finger 48 on the vane 44 of the control assembly spider structure 36 and the upper end plug 40 of each control rod 34. Typically, the upper end plug 40 of each control rod 34 has a threaded outer end 52. Each connecting finger 48 is mounted to the vane 44 in a bayonet-type of welded connection, and has an axial bore 54 formed in a lower portion 56 thereof with a smaller-diameter threaded hole 58 tapped therein at the inner end of the bore 54. The threaded outer end 52 of the upper end plug 40 is threadably received in the tapped hole 58 when the plug 40 is received within the axial bore 54. The end plug 40 is secured or locked therein by a key or pin 60 inserted through aligned holes 62,64 in the sides of the finger 48 and end plug 40 and then welded thereto. Parenthetically, it should be pointed out that the axial bore 54 terminates at the start of an upper portion 66 of each connecting finger 48 where the finger connects with the vane 44.

A major disadvantage of this conventional control assembly 32 is that it is not reconstitutable; that is, the assembly 32 cannot readily be taken apart and have worn or damaged components thereof replaced. Instead, the whole assembly has to be discarded.

However, as mentioned earlier, control rod spider assemblies having removable control rods are known in the prior art. One recent control rod spider assembly that is reconstitutable is disclosed in the aforecited French patent application No. 86/08381. Similar to the above-described prior art control assembly, the French control assembly includes a spider structure with connecting fingers on vanes and a plurality of control rods with upper end plugs having a threaded outer end. However, the attachment joint employed to secure each control rod to one connecting finger is modified somewhat from that described above. Each connecting finger of the French control assembly has an axial bore extending therethrough from end to end. When the upper end plug of one control rod is inserted through the axial bore, its threaded outer end extends above the top end of the finger. A fastener or nut is threaded onto the outer end of the control rod upper end plug until it contacts the top end of the finger. Then a tubular locking cup formed on the control rod upper end plug above the threaded outer end and extending above the threaded nut is deformed radially outward to lock within a groove in the nut to retain the nut thereon.

However disadvantageously, to remove the control rod from the spider structure, the portion of the end plug which includes the threaded outer end with the nut fastened thereon must first be severed or cut off. Thus, the fastening nut must be replaced after removal.

Control Rod Spider Assembly of the Present Invention

Turning now to FIGS. 10-16, there is shown particularly in FIG. 10, in fragmentary form, a reconstitutable control rod spider assembly, generally designated by the numeral 68 and constructed in accordance with the principles of the present invention, which provides an improved arrangement for removing and replacing a control rod. The reconstitutable control assembly 68 basically includes a spider structure 70, a plurality of control rods 72 (only one fragmentarily shown), and a plurality of improved attachment joints 74 (only one shown) for detachable fastening the control rods 72 to the spider structure 70. Except for the parts thereof to be described hereinafter, the spider structure 70 and control rods 72 of the control assembly 68 are identical to that of the prior art control assembly 32 of FIGS. 2 and 3.

Each attachment joint 74 includes an elongated connecting finger 76 on the spider structure 70 and an elongated detachable split upper end plug 78 on each control rod 72. The split upper end plug 78 includes a pair of separate upper and lower plug portions 80,82. The upper plug portion 80 has integrally-connected tandemly-arranged upper, middle and lower sections 80A,80B,80C, whereas the lower plug portion 82 has integrally-connected tandemly-arranged upper, middle and lower segments 82A,82B,82C.

Being substantially identical to the prior art attachment joint 50 of FIG. 8, the connecting finger 76 of the attachment joint 74 of the present invention has an axial bore 84 formed in a lower portion 76A of the finger 76 so as to open at a lower end 86 of the finger, and an internally-threaded hole 88 at an upper end of the bore 84. Further, the upper section 80A of the upper plug portion 80 has external threads 90 allowing it to be rigidly threadably attached within the threaded hole 88 of the connecting finger 76. Also, the lower segment 82C of the lower plug portion 82 is of a smaller diameter size than an upper open end 92 of an elongated hollow tube 94 of the control rod 72 allowing it to be mated and rigidly connected within the control rod tube upper end 92. However, the remaining middle and lower sections 80B,80C of the upper plug portion 80 and the upper and middle segments 82A,82B of the lower plug portion 82 are different from the upper end plug 40 of the prior art attachment joint 50 of FIG. 8.

More particularly, in the attachment joint 74 of the present invention, the lower section 80C of the upper plug portion 80 and the middle segment 82B of the lower plug portion 82 have complementarily threaded means 96,98 defined thereon for rigidly threadably attaching the upper and lower plug portions 80,82 of the split upper end plug 78 to one another. The complementarily threaded means 96 defined on the lower section 80C of the upper plug portion 80 is preferably in the form of external male threads 96 The complementarily threaded means 98 on the middle segment 82B of the lower plug portion 82 preferably includes internal female threads defined in a recess 100 at the inner end of a central opening 102 extending through the upper and middle segments 82A,82B of the lower plug portion 82. The external threads 96 of the upper plug portion 80 are threadably received within the internal threads 98 of the lower plug portion 82 when the portions are attached together.

Further, lower section 80C of the upper plug portion 80 has two different diametric sizes. At the smaller one of the two diameters of the lower section 80C is defined the external threads 96. Bridging the two diameter sizes of the lower section 80C is an annular shoulder 104 which faces toward the lower plug portion 82 and is located just above the external threads 96. The central opening 102 of the middle segment 82B of the lower plug portion 82 is larger in diameter than the internally threaded recess 100 thereof so as to define therebetween an annular ledge 106 located just above the recess 100. The upper plug portion shoulder 104 is capable of being bottomed out in a preloaded condition against the lower plug portion ledge 106 when the upper and lower plug portions 80,82 are threadably attached together.

Further, in the attachment joint 74 of the present invention, the middle section 80B of the upper plug portion 80 and the upper segment 82A of the lower plug portion 82 have complementary interlocking means 108,110 defined thereon for locking the threadably attached upper and lower plug portions 80,82 together so as to resist unthreading thereof from one another during normal reactor operation. The complementary interlocking means 108 defined on the middle section 80B of the upper plug portion 80 is a plurality of flat surfaces 108 formed on the exterior thereof at locations circumferentially spaced from one another. There are preferably four flat surfaces 108 being circumferentially displaced about ninety degrees from one another. The complementary interlocking means 110 defined on the upper segment 82A of the lower plug portion 82 is a hollow sleeve 110 fitted over and about the flat surfaces 108 and deformably crimped thereagainst so as to resist unthreading of the upper and lower plug portions 80,82 from one another. However, the sleeve 110 is thin-walled so as to reformable back to a generally cylindrical configuration upon application of a predetermined torque to the control rod 72 to rotate the same and unthread the lower and upper plug portions 80,82 of the split upper end plug 78 from one another. As can be seem in FIGS. 10, 15 and 16, the upper segment 82A of the lower plug portion 82 defining the sleeve 110 is much thinner in wall thickness than the middle segment 82B thereof.

To summarize, the reconstitutable control assembly 68 of the present invention incorporates a plurality of removable control rods 72 each with a split upper end plug 78 for detachably attaching the control rod 72 to a vane finger 76 of the spider structure 36. Specifically, the split upper end plug 78 is composed of two separate upper and lower plug portions 80,82. The upper and lower plug portions 80,82 of each upper end plug 78 are attached together by screw threading and are torqued to incorporate joint preload. Also, the interlocking flat surfaces 108 and crimped sleeve 110 prevent loosening of the plug portions 80,82 during reactor operation. Locking is accomplished by swaging/crimping the thin-walled sleeve 110 of the lower plug portion upper segment 82A onto flat surfaces 108 of the upper plug portion middle section 80B. The flat surfaces 108 are thus provided on the upper plug portion to prevent subsequent joint loosening.

Removal of a control rod 72 is accomplished by unscrewing the rod which will rotate the lower plug portion 82 of the upper end plug 78 being fixedly attached to the control rod tube 94 relative to the upper plug portion 8 thereof being fixedly attached to the spider vane connecting finger 79 and overcome the crimp retainer locking feature provided by the deformed sleeve 110. A replacement control rod can then be reinstalled and crimped for rod retention. The replacement thin-walled sleeve to be crimped is virgin material on the lower plug portion of the upper end plug on the replacement control rod. The detachable attachment features incorporated by the separate upper and lower plug portions 80,82 of the split upper end plug 78 do not adversely impact any existing desirable features, such as the flexure joint 112 on the upper plug portion 80 and the intended clearance gap 114 between the flexure joint 112 and the lower end 86 of the finger 76; these prior art features are retained in the split upper end plug 78 of the present invention.

Turning now to FIGS. 17-21, a modified split upper end plug 116 is illustrated having upper and lower plug portions 118,120 and employing a different type of locking feature as an alternative to the above-described crimp retainer-type locking feature. In all respects but the following ones the modified split upper end plug 116 is identical to the earlier-described split upper end plug 78.

First, in place of the thin-walled crimpable hollow sleeve 110 of the upper section 82A of the upper end plug lower portion 82 and the flats-bearing middle segment 80B of the upper end plug upper portion 80, a thicker-walled cylindrical upper segment 120A is provided on the lower plug portion 120 and a cylindrical nonflat-bearing middle section 118B is provided on the upper plug portion 118. Thus, where the crimp locking feature was previously employed, the corresponding middle section 118B and upper segment 120A of the respective upper end plug portions 118,120 are of cylindrical configuration and merely form a slip fit type joint instead.

Second, the threaded lower section 118C of the upper plug portion 118 and threaded middle segment 120B of the lower plug portion 120 of the modified split upper end plug 116 are greater in length than the corresponding threaded lower section 80C and middle segment 82B of the respective upper and lower portions 80,82 of the split upper end plug 78. Finally, the modified locking feature is provided by a member 122 in the form of a radially flexible and expandable thread-defining coil deployed between the threaded lower section and middle segment 118C,120B of the respective upper and lower end plug portions 118,120. More particularly, the coil 122 threadably fits between and at its respective interior and exterior peripheries makes threaded frictional engagement with external male threads and internal female threads 124,126 on the respective upper plug portion lower section 118C and lower plug portion middle segment 120B.

The coil 122 thus provides frictional resistance to relative rotation of the upper and lower plug portions 118,120 once attachment of the plug portions has been completed. However, the coil makes it possible to rotate the control rod against the frictional resistance posed by the coil without the need for overriding or overcoming a crimp retainer-type locking feature.

Figures 22, 23:
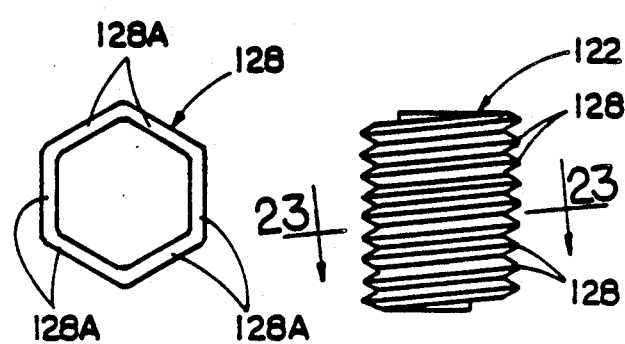
FIG. 22 is an enlarged side elevational view of a radially flexible and expandable thread-defining member incorporated in the modified split upper end plug of FIG. 21.
FIG. 23 is a fragmentary plan view of the member as seen along line 23—23 of FIG. 22.

As best seen in FIGS. 22 and 23, the radially flexible and expandable thread-defining coil 122 is a screw thread coil insert which per se is a commercial product marketed under the tradename HeliCoil. The locking action of the coil is achieved by one or more of the windings 128 of the coil 122 having a series of straight segments or "chords" 128A. When the threaded lower section 118C of the upper plug portion 118 enters the "grip" coil 122, these chordal segments 128A flex outward, creating pressure on the threaded section and providing frictional resistance to rotation of the upper plug portion 118 relative to the lower plug portion 120.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. For use in facilitating replacement of a neutron absorber control rod on a control assembly spider structure, an end plug comprising:
   (a) a pair of separate upper and lower plug portions, said upper plug portion having integral upper, middle and lower sections, said lower plug portion having integral upper, middle and lower segments;
   (b) said upper section of said upper plug portion being configured for rigid attachment to a control assembly spider structure for supporting a control rod, said lower segment of said lower plug portion being configured for rigid connection to the control rod;
   (c) said lower section of said upper plug portion and said middle segment of said lower plug portion being complementarily configured for rigid threaded attachment to one another, said lower section of said upper plug portion and said middle segment of said lower plug portion having respective external male threads and internal female threads thereon;
   (d) said middle section of said upper plug portion and said upper segment of said lower plug portion being complementarily configured for interlocking attachment to one another so as to resist unthreaded detachment of said upper and lower plug portions from one another;
   (e) said middle section of said upper plug portion having a plurality of angularly displaced flat surfaces formed on the exterior thereof at circumferentially spaced locations and said upper segment of said lower plug portion being configured as a thin-walled crimpable deformable sleeve fitted over said flat surfaces and being deformably crimped at thereagainst at angularly displaced regions of said sleeve, said thin-walled deformable sleeve being reformable upon application of a predetermined torque to the lower plug portion to rotate the same and unthread said lower and upper plug portions from one another, said crimpable sleeve of said upper segment of said lower plug portion being smaller in thickness than said internally-threaded middle segment of said lower plug portion.

2. The end plug as recited in claim 1, wherein said upper section of said upper plug portion is externally-threaded for threaded attachment within a threaded hole of a bore in a connecting finger of the control assembly spider structure, said lower segment of said lower plug portion is configured for mated, rigid connection with an upper end of an elongated hollow tube of the control rod.

3. The end plug as recited in claim 1, wherein said lower section of said upper plug portion has external threads thereon and said middle segment of said lower plug portion has a central opening with a recess at its inner end having internal threads for threadably receiving said external threads on said lower section of said upper plug portion.

4. The end plug as recited in claim 3, wherein said lower section of said upper plug portion has an annular shoulder defined thereon adjacent to said external threads and said middle segment of said lower plug portion has an annular ledge defined thereon adjacent to said recess, said shoulder for bottoming out in a preloaded relation against said ledge upon threaded attachment of said upper and lower plug portions together.

5. The end plug as recited in claim 1, wherein said flat surfaces are circumferentially displaced about ninety degrees from one another.

* * * * *